Nov. 19, 1963    R. HAYNES    3,111,474
NUCLEAR FUEL UNITS
Filed Aug. 28, 1957    4 Sheets-Sheet 1

FIG. I.

Inventor
Ronald Haynes
By
Pennie, Edmonds, Morton, Barrows & Taylor
Attorneys

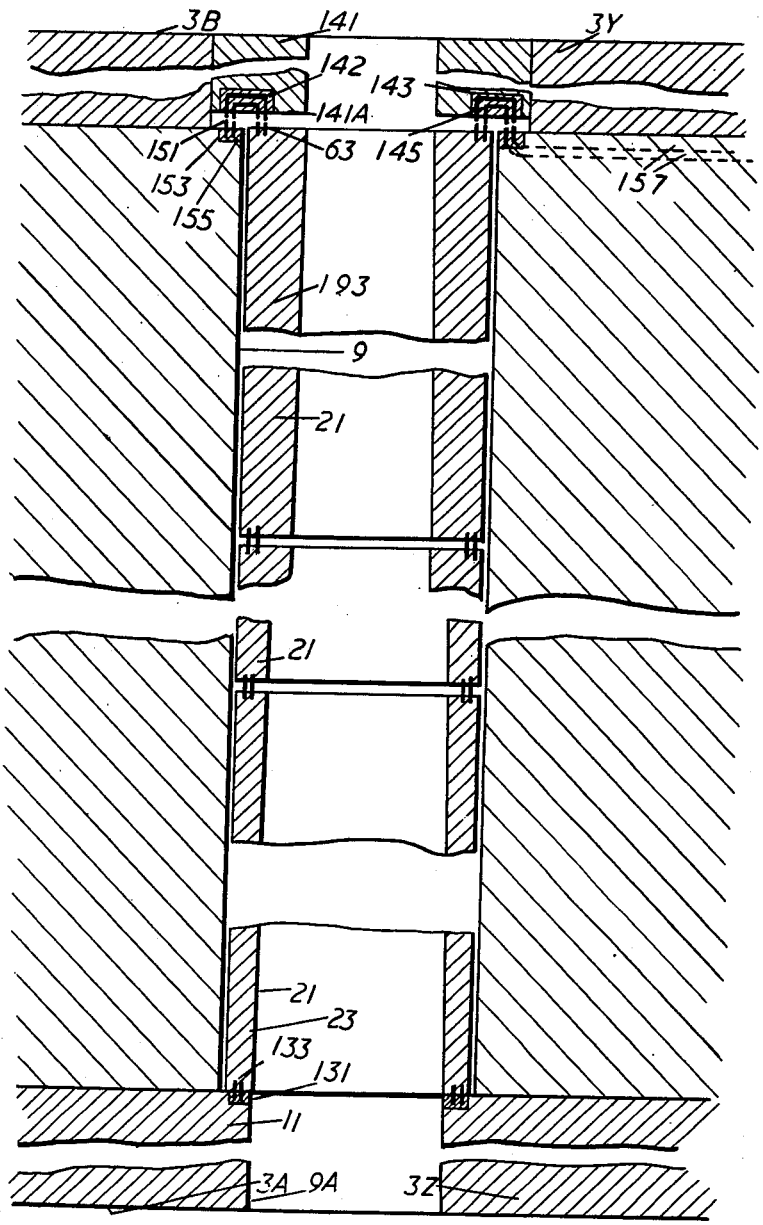

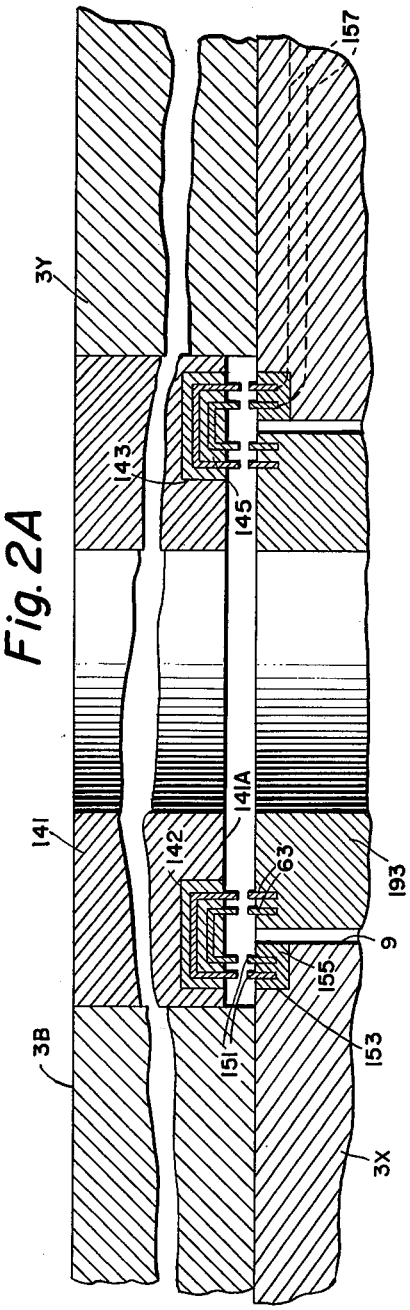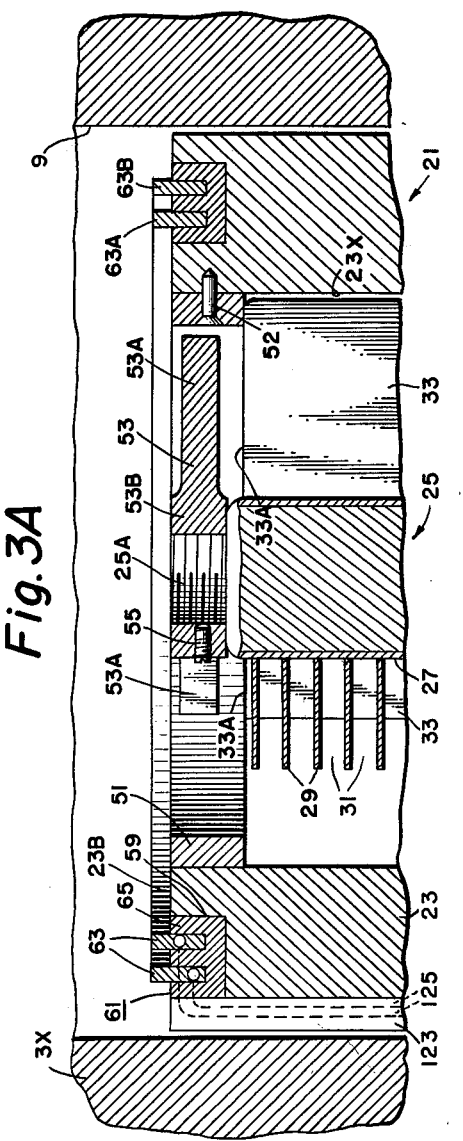

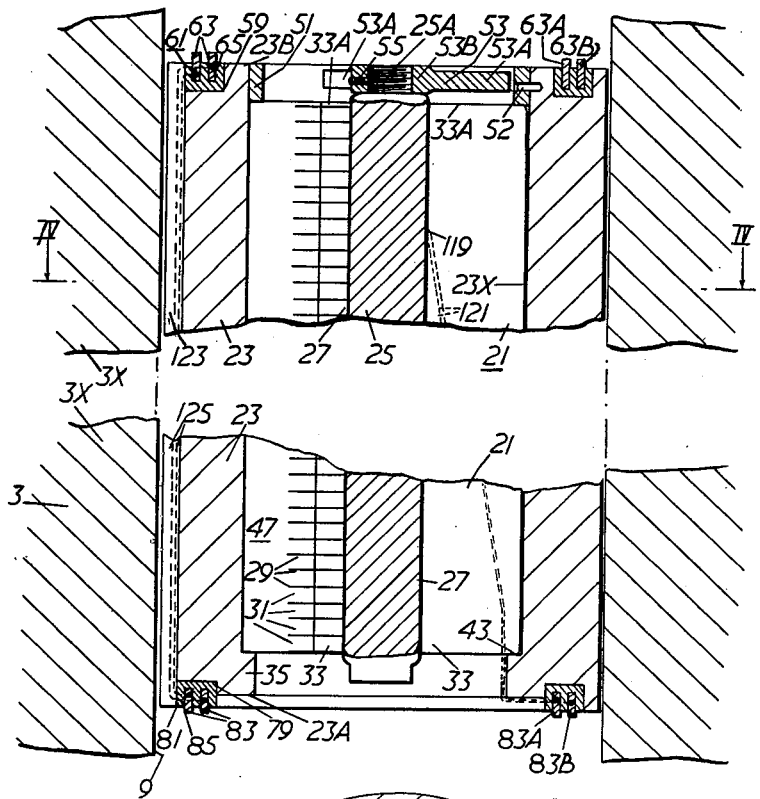
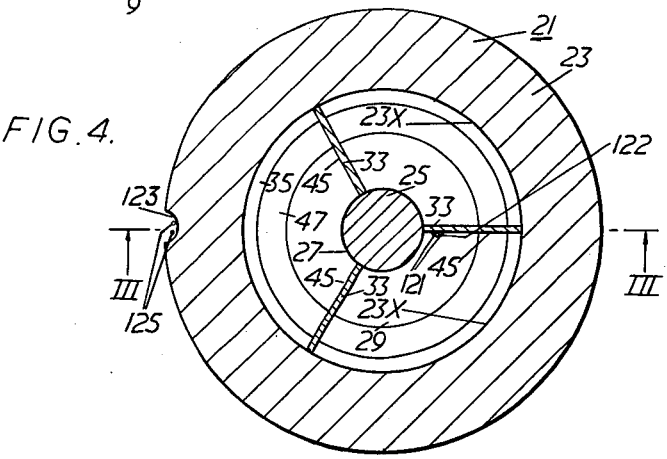
FIG. 3
FIG. 4

United States Patent Office 3,111,474
Patented Nov. 19, 1963

3,111,474
NUCLEAR FUEL UNITS
Ronald Haynes, Sheffield, England, assignor to Babcock & Wilcox Limited, London, England, a British company
Filed Aug. 28, 1957, Ser. No. 680,881
Claims priority, application Great Britain Aug. 30, 1956
1 Claim. (Cl. 204—193.2)

This invention relates to nuclear reactors of the kind in which fuel elements are disposed within channels in a moderator of solid material and to nuclear reactor fuel elements for use in that kind of reactor.

In reactors of the kind specified adequate and reliable support of the fuel elements, avoidance of damage of the elements during handling thereof and effective cooling of the elements are matters of prime importance, whilst a degree of flexibility in the design of fuel elements for use in a core, the moderator of which is established, is highly desirable. The maintenance of reliable indications under all circumstances by the defective element detecting means is also important.

The object of the present invention is to provide a nuclear reactor in which the fuel elements may readily be removed and replaced with little danger of damage to the elements and in which modifications may readily be made to the fuel elements and to the effective moderator in the reactor to improve the nuclear and thermal conditions in the reactor after initial assembly of the moderator and its contamination by operation of the reactor. A further object is to provide an improved fuel unit and a fuel element sleeve for carrying out the object set out above. Further objects and advantages of the invention will be apparent from the subsequent description of the invention.

The invention will now be described, by way of example, with reference to the accompanying partly diagrammatic drawings, in which:

FIGURE 1 is a side elevation of a nuclear reactor of the solid fuel, gas-cooled, graphite moderated type to which the present invention is applied, with its outer biological shield in section;

FIGURE 2 is a sectional side elevation through only a small part of the reactor core, drawn to a much larger scale than FIGURE 1 and with an intermediate part broken away and the fuel elements omitted, showing a fuel element channel in the reactor core;

FIGURE 2A is an enlarged view of the upper portion of FIG. 2;

FIGURE 3 is a sectional side elevation of an intermediate part of the length of the fuel element channel shown in FIGURE 2 taken on the line III—III of FIGURE 4 and as viewed in the direction indicated by the arrows and shows a fuel element in operative position;

FIGURE 3A is an enlarged view of the upper portion of FIG. 3;

FIGURE 4 is a sectional plan view of a fuel element unit taken on the line IV—IV of FIGURE 3.

Figure 5:
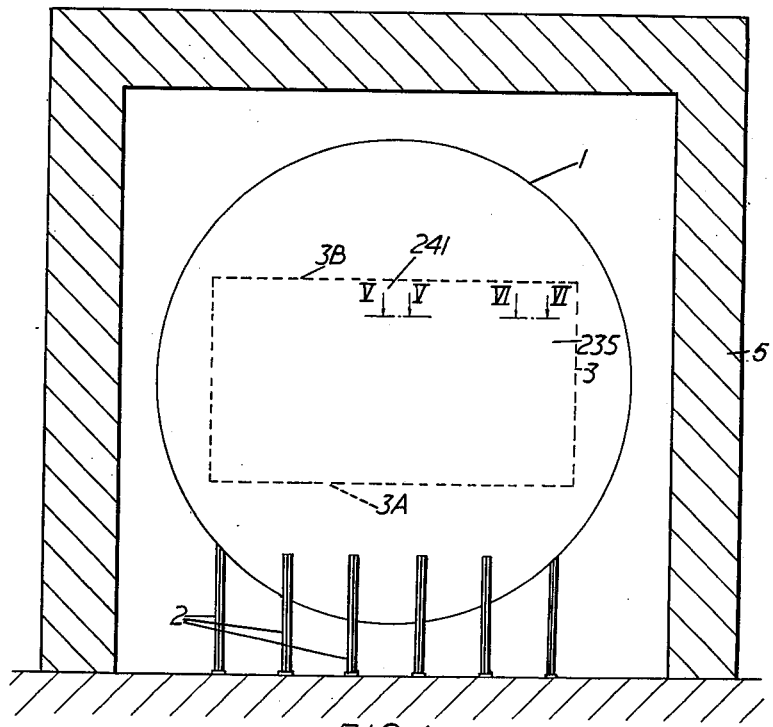
FIGURES 5 and 6 are comparative fragmentary sectional plan views respectively taken on the lines V—V and VI—VI of FIGURE 1 at locations radially spaced apart across the reactor core.

The nuclear reactor illustrated diagrammatically in FIGURE 1 comprises a spherical pressure vessel 1, supported on suitably braced legs 2, containing a reactor core 3 and surrounded by a biological shield 5, formed mainly from concrete and in the form of a short cylinder arranged with its axis vertical, the vessel 1 being provided with inlets and outlets (not shown) for the gaseous coolant. The core 3, which is circular in horizontal cross-section, is built up from many closely fitting graphite blocks arranged so as to leave a large number of vertical holes called coolant or fuel channels extending through the core 3 from its bottom face 3A to its upper face 3B. It will be appreciated that the core 3 is supported upon suitable structural steelwork disposed inside the pressure vessel 1 and so arranged that the weights of the steelwork, the core 3 and fuel elements disposed inside the core are all transmitted through the wall of the vessel 3 as vertical thrusts to the legs 2.

FIGURE 2 illustrates a small part of the core 3 with one of the many fuel channels 9 extending from the core bottom face 3A to the core upper face 3B. The detail construction of the graphite core, showing the separate blocks, is not shown in the drawings, but it is to be appreciated that the core over its height includes a central part 3X (FIG. 3) built up of graphite blocks of high chemical purity which serves as a moderator for slowing down fast neutrons to thermal velocities, an upper carbon block neutron reflector 3Y and a lower carbon block neutron reflector 3Z. It is to be noted that the part 9A of the fuel channel 9 which extends through the lower reflector 3Z is of somewhat lesser diameter than the remainder of the channel in order to provide a projection 11 upon which fuel elements, disposed in the channel, are supported in a manner to be described below.

Each fuel channel 9 normally contains a column consisting of several fuel elements arranged end to end. In the preferred embodiment illustrated, each of these fuel elements is assembled into a separately removable unit comprising a fuel element and an encircling but annularly spaced sleeve, the fuel elements all being similar to one another. Thus in FIGURES 3 and 4 is shown a typical unit 21 in the fuel channel 9, this unit comprising sleeve 23 of graphite of high chemical purity and a canned uranium fuel element 25, the sleeve being somewhat longer than the fuel element.

The fuel element 25 includes a can 27 which contains fertile or/and fissile material and is provided externally with a large number of circumferential fins 29 spaced apart along the length of the element, each fin being radially deep and thin in cross-section and formed integrally with the can 27, the inter-fin grooves 31 being formed by machining operations. The can 27 is provided with three longitudinally extending radial vanes 33, suitably of the same material as the can, equally spaced about the periphery of the can and fitting closely against the inner surface 23X of the sleeve. At a level a short distance above the lower end of the sleeve, the sleeve is formed with an internal projection 35 such that when the fuel element is in place in the sleeve the vanes 33 rest on a shoulder 43 formed by the projection 35 and the bottom end of the fuel element 25 is then somewhat above the lower end of the sleeve 23. To fit the vanes 33 in place on the remainder of the fuel can, after the grooves 31 have been machined to leave the circumferential fins 29, three circumferentially spaced slots 45 extending longitudinally of the fuel element are cut through all the fins 29, the radial vanes 33 are inserted into position in these slots and then welded in place. The radial vanes 33 maintain the fuel element centrally in the sleeve so that a substantially unobstructed annular space 47 exists between the radially outer ends of the fins 29 and the inside surface 23X of the sleeve.

The fuel element 25 is retained in the sleeve 23 by a metal ring 51 fitting tightly within the sleeve and located in contact with the upper ends 33A of the vanes 33 by a plurality of retaining pins, such as the pin 52, extending through the metal ring 51 and fitting into suitable holes formed in the sleeve.

The upper end of the fuel element 25 is provided with a grappling device 53 in the form of a spider having three radial legs 53A and having an internally threaded central boss 53B which is screwed onto an end portion 25A of the fuel element and is locked in position thereon by a set screw 55.

The top face 23B of the sleeve 23 is formed with an annular groove 59 into which is fitted a contact ring assembly 61 consisting of two copper rings 63 embedded in an alumina ring 65. The rings 63 are concentric and spaced from the walls of the groove 59 and are located partly in and partly projecting from the groove 59. The tops of the two rings 63 are coplanar and it will be seen that the two rings are insulated from one another and from the graphite sleeve 23. The lower face 23A of the sleeve 23 is similarly provided with a groove 79 into which is fitted a contact ring assembly 81 comprising two copper rings 83 embedded in an alumina ring 85.

The mean diameters of the radially outer copper rings 63B and 83B are equal, and the mean diameters of the radially inner copper rings 63A and 83A are equal, so that when the unit 21 is assembled in the fuel channel 9 to rest upon a similar unit, the two copper rings 83 on unit 21 respectively contact the upper two copper rings (corresponding to ring 63) on the subjacent unit, and furthermore, upon the assembly on top of the unit 21 of a similar unit, the lowermost copper rings of that unit (corresponding to the rings 83) will respectively contact the two copper rings 63 of the unit 21.

In the column of units in the fuel channel 9, the copper rings at the bottom end of each sleeve carry the weight of that unit and the weights of all the superincumbent units, if any.

Attached to the can of the fuel element 25 in the region of its upper end is a temperature sensitive electrical device in the form of a thermocouple 119 the two leads 121 of which are provided with bead insulation and extend downwardly alongside one of the radial vanes 33 through recesses 122 formed in the fins 31 and at their lower ends are joined respectively to the two copper rings 83. The periphery of the sleeve 23 is formed with a longitudinal groove 123 which extends from end to end of the sleeve and in which are disposed two conductors 125, insulated with ceramic beads and suitably staked in place in the groove, and connecting the upper two copper rings 63 respectively with the lower two copper rings 83.

At the bottom of the fuel channel 9 (see FIGURE 2) is provided a support for the column of fuel elements which consists of an alumina ring 131 fitted within a recess in the upper surface of the reflector 3Z and having embedded in it two concentric copper rings 133 the mean diameters of which are equal, respectively, to the mean diameters of the two copper rings 83, which they engage to transmit the weight of the column of fuel units to the material of the reflector 3Z.

At the top of the fuel channel 9 is provided a terminal piece 141 made of graphite and forming part of the reflector 3Y and having mounted in its lower face 141A an alumina ring 142 in which are embedded two annular channels 143, 145 of equal mean diameters but with the channel 145 being of smaller cross-section than the channel 143, so that the channel 145 may be fitted within the channel 143, as shown, to provide four depending concentric annular rings of which the inner pair respectively contact the two rings 63 in the top face of the uppermost sleeve in the fuel channel. The outer pair of the four concentric rings respectively contact two concentric copper contact rings 151 embedded in an alumina ring 153 mounted in a recess 155 at the upper face of the core part 3X. Insulated electrical leads 157 are connected to these two rings 151 and pass through a channel in the moderator to an appropriate point of egress from the pressure vessel 1. It will be obvious to those skilled in the art that, with the arrangement of copper contact rings shown, any single unit in the column may be provided with a thermo-couple. Externally of the pressure vessel 1 is provided suitable apparatus sensitive to the electrical indication by the thermo-couple and adapted to give an indication of the temperature of the fuel element can where the thermo-couple is attached.

FIGURE 2 illustrates a detail of the graphite sleeves of the fuel units which is not apparent in FIGURES 3 and 4. Over the height of the central part 3X of the reactor core 3 the diameter of the bores through the sleeves in the fuel channel 9 progressively diminishes in an upward direction both along each sleeve and from sleeve to sleeve. Thus the internal diameter of the sleeve 193 of the uppermost unit is considerably less than that of the sleeve 23 of the lowermost unit 21. Since the overall diameter of the circumferential fins 29 of the fuel elements is standard throughout the height of the column, in each fuel channel in which the sleeve bores are tapered the cross-sectional area of the annular passage between the fins and the inner surface of the sleeves progressively diminishes upwardly along the fuel channel.

Figure 6:
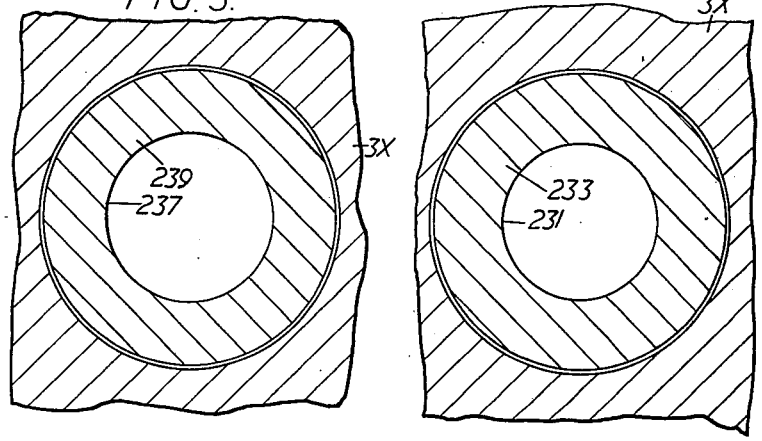

All the fuel channels do not have an equal progressive reduction in the bores of their sleeves. Although the bores of the lowermost ends of the lowermost units in the various fuel channels in the core are of equal diameter, the degree of taper varies among the fuel channels, the degree of taper being largest adjacent the periphery of the reactor core. This variation of the degree of taper is illustrated diagrammatically in FIGURES 5 and 6. Near the top of the core 3, the internal bores 231 in sleeves 233 adjacent an encircling neutron reflector at the periphery 235 of the core are of lesser diameter than the internal bores 237 in sleeves 239 adjacent the centre 241 of the core.

During operation of the nuclear reactor, cooling gas is pumped through an appropriate closed circuit, entering the pressure vessel 1 below the core 3 and passing upwardly through the fuel channels in the core 3 to remove heat generated as a result of nuclear fission. Above the core 3 the gas leaves the pressure vessel 1 and passes to suitable cooling heat exchangers. By the use of circumferential fins on the fuel elements, these fins extending transversely to the direction of gas flow along the fuel channels, the gas flow is made turbulent, thus improving the transfer of heat from the fuel elements to the gas. As the gas rises through a fuel channel, its temperature rises, and with equal heat liberation in each fuel element in a column of similar units, for thermal equilibrium to be obtained the upper fuel element in the column would operate at a higher temperature than the lower elements in the column. By the tapering of the bores of the sleeves of the units, the gas velocity past the elements in the upper parts of a fuel channel is rendered higher than the gas velocity past the elements in the lower parts of the fuel channel, this effect being increased by the increase in volume of the gas as it is heated, and this higher gas velocity results in an improved heat transfer from the fuel elements to the gas which, in an ideal case, would enable the fuel elements in a column to operate all at the same temperature.

Since the sleeve bores in fuel channels near the periphery of the reactor are more tapered than the sleeve bores in fuel channels near the centre of the core, they offer a greater resistance to flow of the cooling gas and as a result a greater rate of mass flow of gas occurs in a fuel channel near the centre of the core than through a fuel channel near the periphery. This results in the absorption of heat more readily from fuel elements near the centre of the core than from those nearer the core periphery, and this is desirable since the neutron density and thus the heat released tends to be greater near the centre of the core than it is near the core periphery.

Both the tapering of the flow spaces along the fuel channels and the graduation of the degree of taper of the flow spaces across the horizontal cross-section of the core lead to a more effective utilisation of the pressure drop across the reactor core.

The thermo-couple 119 provides an electrical current or an electrical voltage which indicates the temperature of the associated fuel element, the electrical circuit extending through the leads 121, the rings 83, the leads 125 and the upper rings 63, this circuit being continued up the column of units by the arrangement of rings (corresponding to the rings 83, 63) and leads (corresponding to the leads 125) in those units to the terminal piece 141 and thence through the channels 143, 145 and the leads 157 to the associated indicating apparatus.

When it is desired to replace the fuel units, they are grappled for and removed one at a time by a remotely controlled tool which is fed down the fuel channel 9 until it engages the legs 53A of the spider of the uppermost unit or uppermost remaining unit in the channel. The tool is then withdrawn taking the unit with it, and the process is repeated until all the units, or all the units it is desired to replace, are removed. Removal of the uppermost unit in the column will be accompanied by removal of the terminal piece 141. Fresh fuel units are then inserted, utilising the tool, one at a time, until the fuel channel contains the desired number of fuel elements. The electrical connections for the thermo-couple leads are then made by inserting the terminal piece 141 and the operation may be repeated if desired for another fuel channel. There is no danger of the circumferential fins 29 on a fuel element being damaged as the fuel element is inserted into the fuel channel since the sleeve surrounds these fins. Furthermore, if during operation of the reactor a fuel element tends to distort, instead of the circumferential fins being able to bind against the wall of the fuel channel, the radial vanes merely come into contact with the inner surface of the sleeve, and the complete unit may be readily removed from the fuel channel for replacement.

Should the can of a fuel element become ruptured when the element is in a fuel channel, severe contamination by the radio-active material will probably be limited to the graphite sleeve, which in due course will be removed from the reactor and discarded. This avoidance of severe contamination of the built-up reactor moderator is important because the nuclear reactor includes devices for indicating the rupturing of a fuel element can, and if the core is already badly contaminated, the percentage increase in contamination due to a freshly burst can may be insufficient to operate such devices.

It will be seen that the sleeve serves as an effective guard for preventing damage to the fuel element during handling thereof and serves in conjunction with the radial vanes as a reinforcement acting to strengthen the fuel element so that in the event of the fuel element during operation tending to buckle under its own weight, such buckling is prevented. This applies also if the construction of fuel element unit described is adopted in a reactor having horizontally extending fuel channels.

If desired, the material in the sleeve may be reduced by means of slots, recesses, or the like, whilst retaining the strength of sleeve necessary to support the fuel element. The slots or recesses preferably do not penetrate the sleeve in order to restrict the effect of a burst can, the sleeve being provided, for example, with longitudinally extending recesses running between end portions of the sleeve and affording a ribbed construction.

In some instances the sleeve may advantageously be longitudinally sectionalised, such construction being advantageous when a material, such as the metal beryllium, is used for the sleeve which is more readily worked in relatively short lengths. Means are then provided for retaining the sections assembled as a unit during handling of the unit, for example, beryllium tie bars in the case of a sectionalized beryllium sleeve.

Since the length of the sleeve is somewhat greater than that of the fuel element, growth of the fuel element within the sleeve is permitted without butting of adjacent fuel elements.

It will be appreciated that in a nuclear reactor of the nature described above, the lengths of the units and, therefore, of the fuel elements may readily be changed during the life of the reactor without introducing difficult problems of support of the fuel elements in their channels. The diameters of the fuel elements and the flow areas through the sleeves about the elements may also be varied within limits. Furthermore, the effective thickness of moderating material separating adjacent fuel elements may be varied by using a moderating material for the sleeves and by choice of sleeve thickness. It will be appreciated, therefore, that a considerable flexibility in design is available when a modification of the form of fuel element employed is desired.

The nature of the radial vanes may also be varied whilst maintaining the desired coolant flow area. For example, if instead of metal vanes radial vanes formed of material such as graphite requiring relatively great thickness for strength are to be used, the effective aperture for gas flow may be maintained by reducing the thickness of the sleeve wall.

What is claimed is:

In a removable fuel unit suitable for use in the vertical coolant-flow channels of a nuclear reactor of the kind including a moderator of solid material provided with vertical coolant-flow channels each accommodating a plurality of fuel units in a stack, the said removable fuel unit comprising an imperforate can, a nuclear fuel element in said can, said unit also including a sleeve surrounding the can in spaced relation thereto, means extending between the can and the sleeve for supporting the can and fuel element and maintaining it in spaced relation with respect to the sleeve and providing a duct between the sleeve and the can for the flow of coolant through the sleeve, the length of the can being less than that of the sleeve and the lower end of the can terminating above the plane of the lower end of the sleeve, so that when a plurality of the fuel units each with its sleeve are stacked one above the other in a vertical coolant-flow channel of the nuclear reactor, the weight of each fuel element is transferred to its associated sleeve and thence down the stack from sleeve to sleeve of the plurality of stacked removable fuel units, the improvement in which a pair of spaced concentric metal contact rings are mounted at each end of each sleeve, the pair of contact rings at each end of the sleeve being insulated from each other and from the sleeve, a pair of electrical leads for a temperature sensitive electrical device are located in the wall of the sleeve and are connected, respectively, with the inner and outer contact rings at the opposite ends of the sleeve, and the metal contact rings at the lower end of the sleeve of one unit engage the metal contact rings at the upper end of the sleeve of the next lower unit of the plurality of stacked fuel units to provide an electrical circuit through the length of the sleeves of the stacked fuel units.

References Cited in the file of this patent

UNITED STATES PATENTS

| | | |
|---|---|---|
| 1,560,815 | Hill | Nov. 10, 1925 |
| 2,108,174 | Mays | Feb. 15, 1938 |
| 2,708,656 | Fermi | May 17, 1955 |
| 2,782,158 | Wheeler | Feb. 19, 1957 |
| 2,825,689 | Szilard et al. | Mar. 4, 1958 |
| 2,831,807 | McGarry | Apr. 22, 1958 |
| 2,856,341 | Kanne | Oct. 14, 1958 |
| 2,863,815 | Moore et al. | Dec. 9, 1958 |
| 2,877,170 | Greenhalgh et al. | Mar. 10, 1959 |
| 2,898,280 | Schultz | Aug. 4, 1959 |
| 2,949,415 | Stubbs et al. | Aug. 16, 1960 |
| 2,985,575 | Dennis et al. | May 23, 1961 |

FOREIGN PATENTS

| | | |
|---|---|---|
| 159,720 | Australia | Nov. 10, 1954 |